(12) United States Patent
Jakob

(10) Patent No.: US 10,981,288 B2
(45) Date of Patent: Apr. 20, 2021

(54) HYBRID SETTING UNIT FOR STRIPPING PINS AND/OR STRIPPING CLAWS

(71) Applicant: BOXPLAN GMBH & CO.KG, Steisslingen (DE)

(72) Inventor: Joachim Jakob, Radolfzell (DE)

(73) Assignee: BOXPLAN GMBH & CO.KG, Steisslingen (DE)

( * ) Notice: Subject to any disclaimer, the term of this patent is extended or adjusted under 35 U.S.C. 154(b) by 368 days.

(21) Appl. No.: 16/301,293

(22) PCT Filed: May 11, 2017

(86) PCT No.: PCT/EP2017/061293
§ 371 (c)(1),
(2) Date: Nov. 13, 2018

(87) PCT Pub. No.: WO2017/194659
PCT Pub. Date: Nov. 16, 2017

(65) Prior Publication Data
US 2020/0316806 A1  Oct. 8, 2020

(30) Foreign Application Priority Data

May 13, 2016   (DE) ..................... 10 2016 108 880.3

(51) Int. Cl.
*B26D 7/18*  (2006.01)
*B26D 7/26*  (2006.01)
(Continued)

(52) U.S. Cl.
CPC ............ *B26D 7/1818* (2013.01); *B23P 19/04* (2013.01); *B26F 1/40* (2013.01); *B26D 7/2614* (2013.01);
(Continued)

(58) Field of Classification Search
CPC ................ B26D 7/1818; B26D 7/2416; B26D 2007/1872; B26D 2007/189; B26F 1/40; B23P 19/04
See application file for complete search history.

(56) References Cited

FOREIGN PATENT DOCUMENTS

DE   10 2008 062 114 A1   6/2010
DE      102008062114 A1 *  6/2010   ........... B26D 7/1818
(Continued)

OTHER PUBLICATIONS

International Search Report dated Oct. 17, 2017 in corresponding PCT International Application No. PCT/EP2017/061293.
(Continued)

*Primary Examiner* — Bayan Salone
(74) *Attorney, Agent, or Firm* — Bookoff McAndrews, PLLC

(57) ABSTRACT

A setting unit for producing a stripping tool with stripping pins (16) and/or stripping claws (15) the unit includes a base plate (10), which has a stripping pin insertion unit (28) and a stripping claw insertion unit (29), wherein the stripping pin insertion unit (28) interacts with a first plunger unit (21) and the stripping claw insertion unit (29) interacts with a second plunger unit (22). A pressure plate (3) is to be arranged between the base plate (10) and a head plate (2). The pressure plate (3) is movable between the base plate (10) and the head plate (2). The pressure plate has at least four passages (33, 33.1, 33.2, 34, 34.1, 34.2). At least one of the passages (33, 34) can be closed means of a pivoting module (6), whereby the first plunger unit (21) and/or the second plunger unit (22) can be activated.

9 Claims, 2 Drawing Sheets

(51) Int. Cl.
*B26F 1/40* (2006.01)
*B23P 19/04* (2006.01)
(52) U.S. Cl.
CPC .................. *B26D 2007/189* (2013.01); *B26D 2007/1872* (2013.01)

(56) References Cited

FOREIGN PATENT DOCUMENTS

DE     10 2010 020 127 A1    10/2010
DE        102010020127 A1 * 10/2010 ........... B26D 7/1818

OTHER PUBLICATIONS

Written Opinion dated Oct. 17, 2017 in corresponding PCT International Application No. PCT/EP2017/061293.

* cited by examiner

HYBRID SETTING UNIT FOR STRIPPING PINS AND/OR STRIPPING CLAWS

CROSS-REFERENCE TO RELATED APPLICATIONS

The present application is a 35 U.S.C. §§ 371 national phase conversion of PCT/EP2017/061293, filed May 11, 2017, which claims priority of German Patent Application No. 10 2016 108 880.3, filed May 13, 2016, the contents of which are incorporated by reference herein. The PCT International Application was published in the German language.

The invention relates to a setting unit for producing a stripping tool.

PRIOR ART

Stripping plates, in which stripping pins or stripping flat strips are inserted, are usually used as stripping tools for punching and stripping. An example of a stripping pin is the crown pin produced by the company Boxplan. The stripping pin has a circular cross-section.

Stripping flat strips have a line with two points on their front side. Normally, stripping flat strips can only be inserted manually into a stripping plate because of their small strip-shaped cross-section. To this end, an opening, which essentially corresponds to a cross-section of the stripping flat strip, is made in the stripping plate. These slits are usually lasered.

Insertion of the stripping pins is basically possible using a machine, since these are relatively stable. To this end, such pins have a conical taper at one end, which is inserted into the stripping plate. Additionally, these pins usually have a recess on their upper side. The stripping pins are driven directly into the stripping plate material using the end where the chronic taper is arranged.

Disadvantageously, stripping tools in which stripping pins and stripping flat strips are provided, need to be produced in a very complex manner. In a first very complex, but hitherto always necessary, operation, the slits or openings for the stripping flat strips are pre-cut. The stripping pins are then driven, manually or using a machine, into the stripping plate. Thereafter, the stripping flat strips are inserted, by hand or using a machine, into the slits in the stripping plate, which are created in a previously necessary operation.

DISCLOSURE OF THE INVENTION

Object

The object of the invention is to provide a device for producing a stripping tool, with which stripping pins and stripping flat strips can be inserted simply into a stripping plate. To this end, it should be possible to directly insert the stripping strips or stripping claws into a stripping plate in one operation, without the need for a previously milled or lasered slit in the stripping plate.

Achieving the Object

In typical embodiments, a setting unit for producing a stripping tool comprises a CAD-software supported control unit, a housing for a stripping plate, a stripping strip insertion unit and a stripping pin insertion unit. This offers the advantage that, in a simple manner and in one operation, stripping strips with a strip-shaped cross-section and stripping pins with a circular cross-section can be inserted into a stripping plate without needing to prepare or treat the stripping plate for this purpose.

The stripping plate preferably has a cross-section with a diameter of 1 mm to 4 mm. This enables the best stripping results to be achieved.

A stripping strip, which is hereinafter referred to as a stripping claw, preferably has a rectangular cross-section. The cross-section of the stripping claw preferably has a thickness of 0.1 mm to 3 mm. The cross-section of the stripping claw preferably has a length of 2 mm to 30 mm. The cross-section of the stripping claw may expediently have a bend and/or one or more webs.

In typical embodiments, the stripping claw insertion unit is suitable for inserting a stripping claw into a stripping plate, without it being necessary to previously make an inserting slit, inserting strip or another opening in the stripping board. This offers the advantage that the stripping claw can be inserted, directly and without complex preparation, into a stripping board. This means that the stripping claws do not completely penetrate the stripping plate, but only penetrate up to a few millimeters into the surface of the stripping plate. This avoids the need for hitherto necessary and time intensive operations.

In typical embodiments, the stripping claw insertion unit is suitable for accommodating a stripping claw by means of a claw setting sleeve. The stripping claw is loaded individually into the claw setting sleeve via a feed from a cassette or another supply. This offers the advantage that the stripping claw is automatically accommodated.

Previously necessary detection equipment, which could detect and locate the prepared slits in the stripping plate, is now superfluous, since the stripping claws can now be inserted, directly and without prepared slits, into the stripping plate. This offers the advantage that this detection equipment, as well as the preparation of the stripping plate with slits, can be eliminated. Manual driving-in of the stripping claws, which was hitherto still partly necessary, is therefore unnecessary.

In typical embodiments, the stripping pin insertion unit is suitable for driving a stripping pin into the stripping plate. The stripping pin is preferably driven directly into the material or into the surface of the stripping plate. This means that the stripping pins do not completely penetrate the stripping plate but only penetrate up to e.g. 2 mm into the surface of the stripping plate. The stripping plate is preferably made of wood. However, other materials are also conceivable and should be included in the present invention.

In typical embodiments, the stripping pin insertion unit is suitable for accommodating a stripping pin fed from a cassette or a supply via a pin feed tube. Feeding via the pin feed tube is performed e.g. by means of compressed air. This offers the advantage that the stripping pin is accommodated in an automated manner.

In typical embodiments, the control computer is suitable for controlling the setting unit such that the stripping pins and the stripping claws can be removed from the cassette or from a supply and inserted into the stripping plate according to a predetermined plan or pattern.

In typical embodiments, the control computer is suitable for operating the setting unit such that the stripping pins and the stripping claws can be set according to a predetermined plan or pattern.

In typical embodiments, the stripping pin insertion unit and the stripping claw insertion unit are hybridized in a setting unit.

In typical embodiments, the stripping pins and the stripping claws are driven directly into the stripping plate material. This offers the advantage that the operation of milling or lasering respective recesses for stripping pins and for stripping claws or stripping strips in a stripping plate, as was necessary prior to the invention herein, is eliminated. For the stripping claws or stripping pins, it is now possible to insert them directly into a stripping plate.

In typical embodiments, the setting unit has different types of cassettes or supplies, which are in turn divided into corresponding diameters or lengths. The cassettes or supplies for the stripping pins are constructed such that the stripping pins are loosely stacked next to and on top of each other. A module at the lower end of the cassette or the supply always removes only one pin. This is then blown via a pin feed tube into the pin setting sleeve and then inserted into the stripping plate. For this rear feed, the pin setting sleeve folds approximately 90°, from the vertical pressing-in position into a horizontal loading position, for each loading process. The pin setting sleeve of the stripping pin insertion unit can be exchanged, so that different stripping pins can also be inserted. The pin setting sleeve has pin clamping slits, which prevent the stripping pin from slipping out by clamping.

The stripping claws are stored in the cassettes or supplies for the stripping claws, precisely stacked on top of each other, and are removed individually at the lower end. A feed transports the individual stripping claws to the claw setting sleeve, which takes these stripping claws from the feed. To this end, the claw setting sleeve has claw clamping slits, which prevent the stripping claws from automatically slipping following receipt. After the angle has been aligned by means of a rotary module, the stripping claw is inserted into a stripping plate using a first claw plunger or a second claw plunger of a second plunger unit.

Insertion of the stripping pins and stripping claws is performed using so-called pin or claw plungers, which penetrate the pin setting sleeve or the claw setting sleeve and, thus, drive the stripping pins or stripping claws, which are fixed by means of pin clamping slits or claw clamping slits, into the stripping plate.

To this end, in typical embodiments, a first plunger unit and a second plunger unit are provided. The first plunger unit comprises a respective first pin plunger and a second pin plunger. The second plunger unit comprises another respective first claw plunger and a second claw plunger. The first plunger unit is provided for pressing in the stripping pins. The second plunger unit is provided for pressing in the stripping claws.

The first and second pin plungers and the first and second claw plungers, are activated by means of a dynamic pressure plate, which is movable between a head plate above and the base plate below the pressure plate. In this case, a pivoting module is used to determine whether the first plunger unit or the second plunger unit is activated. The pivoting module is arranged at the pressure plate such that a central passage of, on the one hand, three passages of the pressure plate or an opposite other central passage or, on the other hand, three passages of the pressure plate, can be closed.

If the pressure plate moves in the direction of the base plate, three of the plungers, e.g. the second pin plunger, the first claw plunger and the second claw plunger, extend through the pressure plate and thereby remain inactive. One plunger, e.g. the first pin plunger, is then activated as a result of the central passage closed by the pivoting module.

The pin or claw plunger of the first or the second plunger unit, which is respectively arranged at the central one of the three passages of the pressure plate, is in the active position. One of the respective two pin or claw plungers can be moved into this active position by means of the first or second plunger unit.

The setting unit executes the instructions from the CAD regarding which stripping pin and which stripping claw is to be set at which angle, at which position.

In a preferred embodiment, the process of pressing in the stripping pins or the stripping claws is performed only with one drive and one pressure plate. In doing so, the pivoting module, which activates the first or the second plunger unit by closing the central passage or the other central passage of the pressure plate, is necessary.

A further embodiment is presented such that the pressure plate is divided between the first plunger unit and the second plunger unit. In this case, a drive always only moves one pressure plate half by means of a coupling, as a result of which either the first plunger unit or the second plunger unit is activated.

In addition, it is also conceivable that, with the divided pressure plate, both pressure plate halves are moved with a separate drive.

Therefore, in the last two embodiments with a divided pressure plate, activating or switching to either the first plunger unit or the second plunger unit using the pivoting module, is dispensed with.

DESCRIPTION OF THE FIGURES

Further advantages, characteristics and details of the invention originate from the following description of preferred embodiments, as well as from the drawings, which show in.

DESCRIPTION OF AN EMBODIMENT

Figure 1:
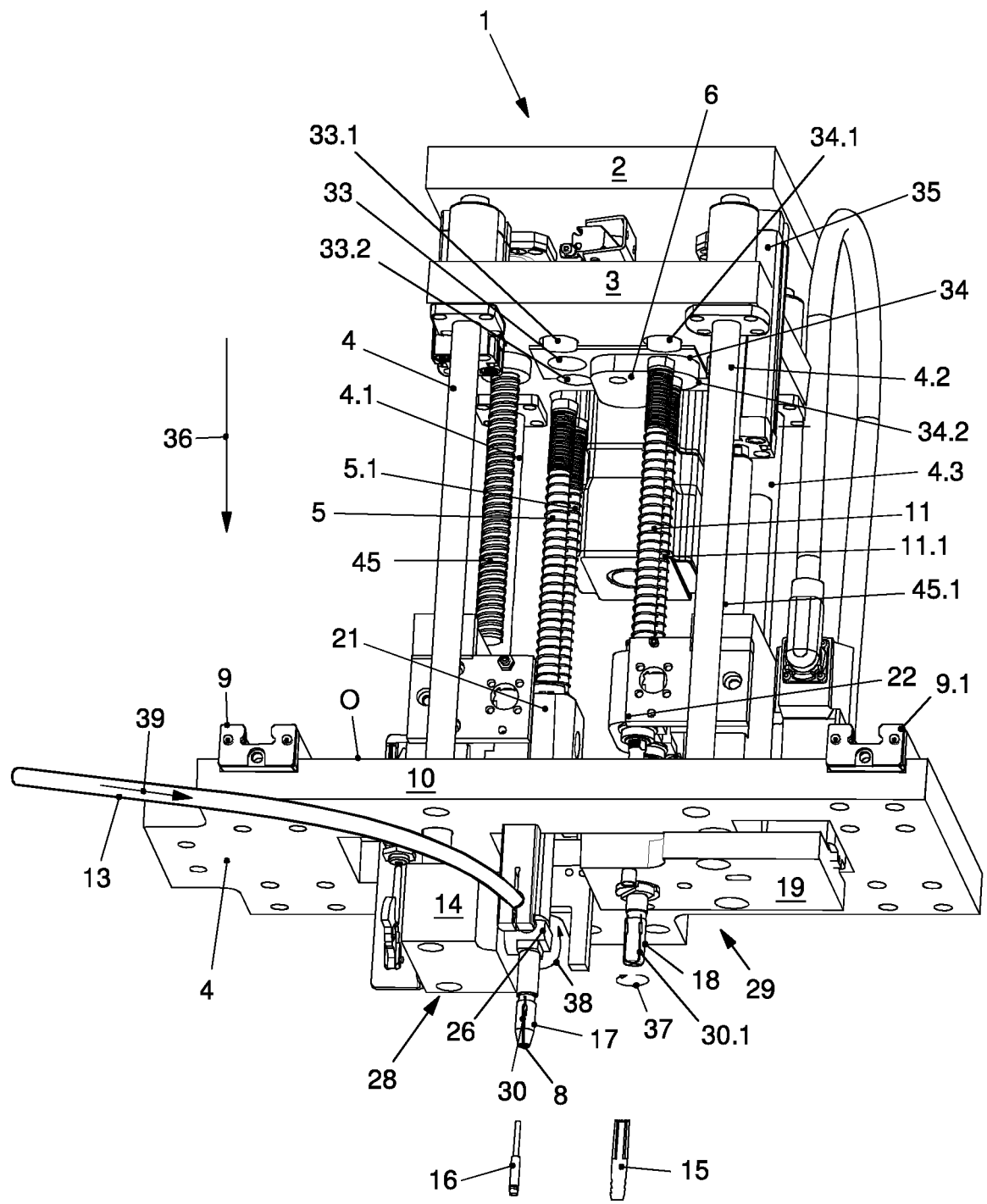
FIG. 1 a perspective view of an embodiment according to the invention of a setting unit with a stripping pin insertion unit and a stripping claw insertion unit, FIG. 2 a perspective view of an embodiment of a first plunger unit for stripping pins, FIG. 3 a perspective view of an embodiment of a second plunger unit for stripping claws.

FIG. 1 shows a setting unit 1. In the embodiment shown, the setting unit 1 comprises a base plate 10, a stripping pin insertion unit 28 and a stripping claw insertion unit 29, wherein the stripping pin insertion unit 28 has a first plunger unit 21 and the stripping claw insertion unit 29 has a second plunger unit 22.

The stripping pin insertion unit 28 and the stripping claw insertion unit 29 are arranged on the underside U of the base plate 10. The underside U is the side facing a stripping tool (not shown in greater detail) below the base plate. The stripping pin insertion unit 28 has a folding module 14, a pin feed tube 13 driven e.g. with compressed air and a pin setting sleeve 17 with pin clamping slits 30. Stripping pins 16 are fed in the direction of the arrow 39 to the pin setting sleeve 17 of the stripping pin insertion unit 28 via the pin feed tube 13.

To load the pin setting sleeve 17 via the pin feed tube 13, the pin setting sleeve 17 is folded using the folding module 14 from a loading position parallel to a stripping tool (not shown in greater detail) into a pressing-in position oriented towards the stripping tool. The folding direction of the pin setting sleeve 17 is illustrated by the arrow 38. FIG. 1 shows the pressing-in position of the pin setting sleeve 17 oriented towards the stripping tool.

Once the stripping pin 16 has been loaded in the loading position, the folding module 14 folds the pin setting sleeve 17 back into the pressing-in position. The loaded stripping pin 16 can then be inserted directly, by means of a first pin plunger 5 or a second pin plunger 5.1 of a first plunger unit 21, into a stripping tool (not shown in greater detail).

The pin setting sleeve 17 is formed in the shape of a sleeve and has a clamping jaw 8, wherein the clamping jaw 8 comprises at least two jaw parts, which can be spaced apart from each other for holding the stripping pin 16, and has corresponding pin clamping slits 30.

The stripping claw insertion unit 29 has a rotary module 19 and a claw setting sleeve 18. From a stripping claw cassette or a stripping claw supply (not shown), a movable feed (not shown in greater detail) leads to the claw setting sleeve 18 of the stripping claw insertion unit 29, in order to load the latter with a stripping claw 15. The claw setting sleeve 18 is arranged so as to be rotatable by 360°. The rotational movement is performed by the rotary module 19 and illustrated by the arrow 37.

The claw setting sleeve 18 is also formed as a sleeve and has one or more claw clamping slits 30.1, by means of which the stripping claw 15 is received by the movable feed.

The first plunger unit 21 is in operative connection with the stripping pin insertion unit 28. The stripping pins 16 are inserted through the pin setting sleeve 17 into the stripping tool via this first plunger unit 21 and the first pin plunger 5 and second pin plunger 5.1 integrated therein.

A second plunger unit 22 is in operative connection with the stripping claw insertion unit 29. The stripping claws 15 are pressed through the claw sleeve 18 into the stripping tool (not shown in greater detail) via this second plunger unit 22 and the first claw plunger 11 and second claw plunger 11.1 integrated therein.

A first guide rail 9 and a second guide rail 9.1 are arranged on the upper side O of the base plate 10 of the setting unit 1. The upper side O is the side facing the two plunger units 21 and 22. The guide rails 9 or 9.1 are arranged on the base plate 10 such that the two plunger units 21 or 22 are mounted between them.

Furthermore, a pressure plate 3 is located between the base plate 10 and a head plate 2. The base plate 10, the pressure plate 3 and the head plate 2 are connected to each other via a first guide shaft 4, a second guide shaft 4.1, a third guide shaft 4.2 and a fourth guide shaft 4.3.

The first guide shaft 4, the second guide shaft 4.1, the third guide shaft 4.2 and the fourth guide shaft 4.3 extend through the pressure plate 3 at their respective corner areas. As a result, the pressure plate 3 can be moved between the base plate 10 and the head plate 2. The movability of the pressure plate 3 between the head plate 2 and the base plate 10 is ensured by a drive 35. The first plunger unit 21 and the second plunger unit 22 are arranged between the base plate 10 and the movable pressure plate 3. The pressure plate 3 arranged movably between the base plate 10 and the head plate 2 has six passages; on the one hand, a central passage 33, a first passage 33.1 and a third passage 33.2 and, on the other hand, a further central passage 34, a fourth passage 34.1 and a sixth passage 34.2.

Furthermore, a pivoting module 6 is arranged in a central position on the side of the movable pressure plate 3 facing the base plate 10. The pivoting module 6 can be oriented via a control computer (not shown in greater detail) such that either the central passage 33 of the pressure plate 3 or the central passage 34 of the pressure plate 3 is closed, so that either the pin plunger 5.1 of the first plunger unit 21 or the claw plunger 11.1 of the second plunger unit 22 is activated.

FIG. 1 shows the situation in which the pivoting module 6 closes the central passage 34 and thereby activates the claw plunger 11.1. Conversely, the central passage 33 is not closed and therefore penetrable for the pin plunger 5.1. At the same time, the first passage 33.1 as well as the fourth passage 34.1 are likewise not closed and are therefore penetrable for the pin plunger 5 or the claw plunger 11.

The first passage 33.1, the third passage 33.2, the fourth passage 34.1 and the sixth passage 34.2 thus ensure that the pin or claw plungers, which are not assigned to the central passage 33 or the central passage 34, remain inactive and can extend through the pressure plate 3.

Figure 2:
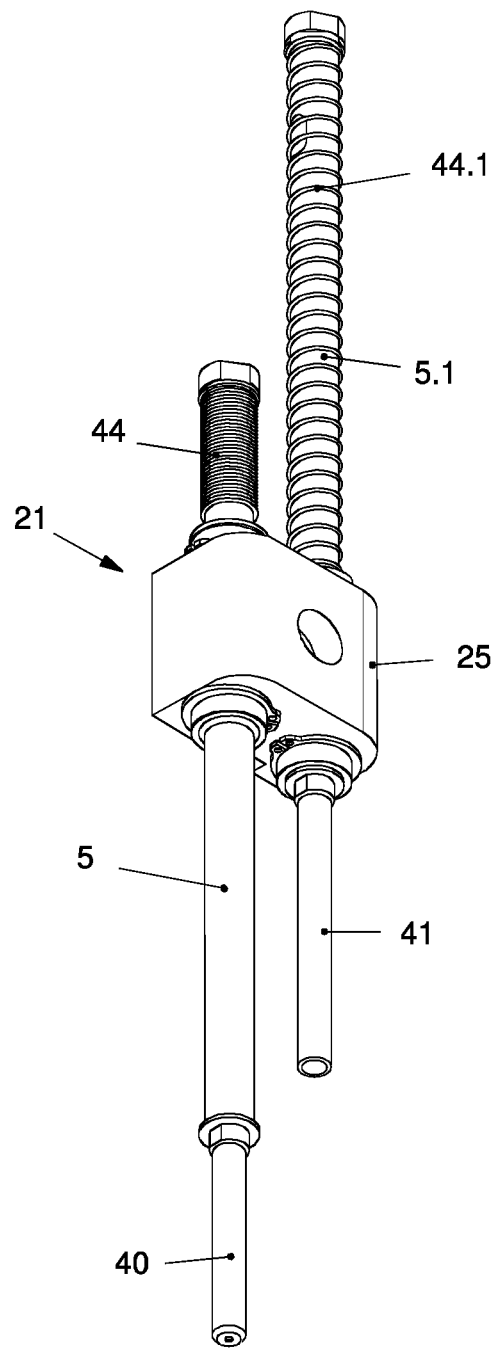

FIG. 2 shows the first plunger unit 21. The latter comprises a plunger holder 25 for guiding the first pin plunger 5 and the second pin plunger 5.1 The first pin plunger 5 and the second pin plunger 5.1 both extend moveably through the plunger holder 25. They differ from each other, on the side of the plunger holder 25 facing the stripping tool, only by a varying pin plunger head. The first pin plunger 5 has a pin plunger head 40, which is predominantly suitable for stronger stripping pins 16. The second pin plunger 5.1 has a pin plunger head 41, which is predominantly suitable for average-strength to weaker stripping pins 16. The first pin plunger head 40 and the second pin plunger head 41 can be exchanged, as necessary.

On the side of the plunger holder 25 facing away from the stripping tool, the first stripping pin 5 and the second stripping pin 5.1 are constructed identically. The first pin plunger 5 comprises a surrounding pin plunger spring 44, the second pin plunger 5.1 comprises a surrounding second pin plunger spring 44.1. The first pin plunger spring 44 and the second pin plunger spring 44.1 ensure that the first pin plunger 5 or the second pin plunger 5.1 return to their respective starting positions following a pressing-in process.

FIG. 2 shows the situation in which the first pin plunger 5 is pressed down by the pressure plate 3—not shown in FIG. 2—or the pivoting module 6 connected therewith, such that the stripping pin 16 is pressed by the first pin plunger head 40 out of the pin setting sleeve 17 into the stripping tool. The stripping pin 16 and the pin setting sleeve 17 are not shown.

Figure 3:
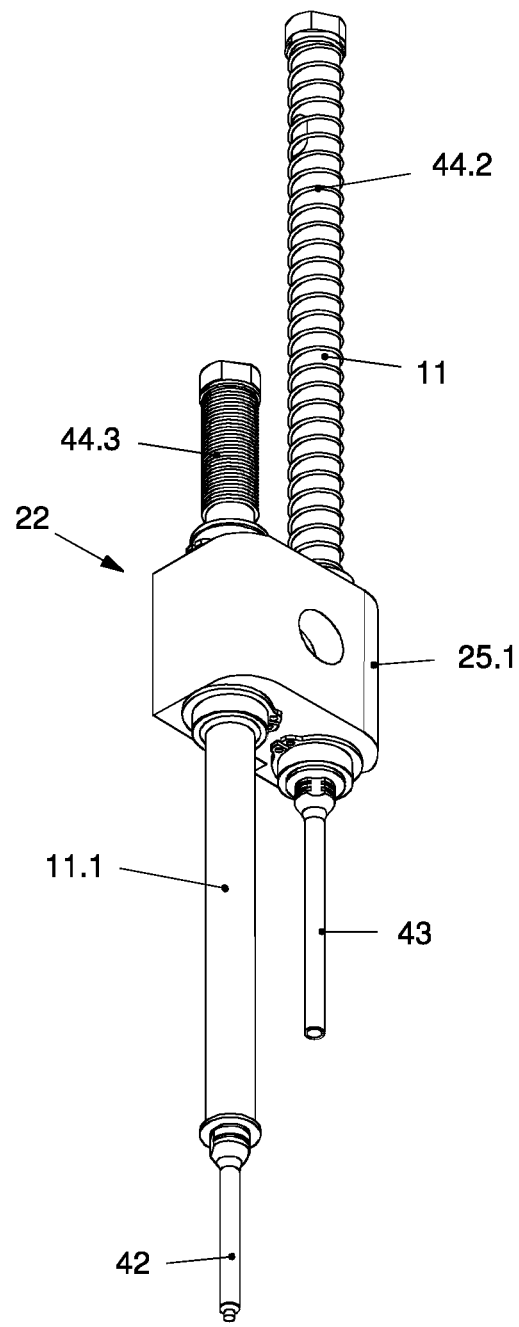

FIG. 3 shows the second plunger unit 22. The latter comprises a plunger holder 25.1 for guiding the first claw plunger 11 and the second claw plunger 11.1 The first claw plunger 11 and the second claw plunger 11.1 both extend moveably through the plunger holder 25.1. They differ from each other, on the side of the plunger holder 25.1 facing the stripping tool, only by a varying claw plunger head. The first claw plunger 11 has a claw plunger head 42. The second claw plunger 11.1 has a claw plunger head 43. The claw plunger heads 42 or 43 are designed for differently shaped stripping claws 15. All other illustrated elements have already been described in FIG. 2 and are identical to the elements of the first plunger unit 21.

The present invention functions as follows:

At the beginning of an operation, the pin setting sleeve 17 is in the loading position and is then loaded with a stripping pin 16 from a supply (not shown in greater detail) via the pin feed tube 13 driven by compressed air.

Once the stripping pin 16 has been loaded in the loading position, the folding module 14 folds the pin setting sleeve 17 into the pressing-in position of the pin. At the same time, the claw setting sleeve 18 can be loaded with a stripping claw 15 via a movable feed from the cassette or the other supply.

Thereafter, the claw setting sleeve 18, and the stripping claw 15 held there, are oriented using the rotary module 19.

The rotary module 19 is capable of rotating the claw setting sleeve 18 with the retained stripping claw 15 by 360°, such that every desired position of the stripping claw 15 relative to the stripping tool can be occupied.

Thereafter or at the same time, the orientation of the pivoting module 6 determines whether the first plunger unit 21 or the second plunger unit 22 is activated, by either the central passage 33 or the central passage 34 of the pressure plate 3 being closed by the pivoting module 6.

In a further embodiment (not shown), the pivoting module 6 can also close both central passages 33 and 34. In this manner, it can be determined that the first plunger unit 21 and the second plunger unit 22 are activated.

Subsequently or at the same time, the setting unit 1 is moved to a specific position above the stripping tool to be formed in accordance with the control computer's commands. After reaching the desired position, the pressure plate 3 is moved by the drive 35 in the direction of an arrow 36, see FIG. 1, between the head plate 2 and the base plate 10. As a result, either the first pin plunger 5 or the second pin plunger 5.1 of the first plunger unit 21 or the first claw plunger 11 or the second claw plunger 11.1 of the second plunger unit 22 is activated. This is regulated by the pivoting module 6, which either closes the central passage 33 and thereby activates the first plunger unit 21, or closes the other central passage 34 and thereby activates the second plunger unit 22.

In the process, either the first pin plunger 5 or the second pin plunger 5.1 of the first plunger unit 21 engages into the pin setting sleeve 17 and presses the stripping pin 16 clamped there out of the clamping jaw 8 into the stripping tool.

The second plunger unit 22 is essentially moved in the same manner and also presses the stripping claw 15 into the stripping tool either using the first claw plunger 11 or the second claw plunger 11.1.

The first pin plunger spring 44, the second pin plunger spring 44.1 as well as the first claw plunger spring 44.2 and the second claw plunger spring 44.3 enable the first pin plunger 5 or the second pin plunger 5.1 as well as the first claw plunger 11 or the second claw plunger 11.1 to be withdrawn from the pin setting sleeve 17 or the claw setting sleeve 18. This can also be assisted by a drive.

Furthermore, the pressure plate 3 also moves back into the starting position in the direction of the head plate 2. In the process, in addition to the drive 35, a first pressure plate recoil spring 45 and a second pressure plate recoil spring 45.1 are used to provide assistance. The first pressure plate recoil spring 45 is arranged between the first guide shaft 4 and the second guide shaft 4.1 on the side of the pressure plate 3 facing the base plate 10. The second pressure plate recoil spring 45.1 is arranged between the third guide shaft 4.2 and the fourth guide shaft 4.3 on the side of the pressure plate 3 facing the base plate 10.

Following this, a new operation begins.

LIST OF REFERENCES

| | |
|---|---|
| 1 | setting unit |
| 2 | head plate |
| 3 | pressure plate |
| 4 | first guide shaft |
| 4.1 | second guide shaft |
| 4.2 | third guide shaft |
| 4.3 | fourth guide shaft |
| 5 | first pin plunger |
| 5.1 | second pin plunger |
| 6 | pivoting module |
| 8 | clamping jaw |
| 9 | first guide rail |
| 9.1 | second guide rail |
| 10 | base plate |
| 11 | first claw plunger |
| 11.1 | second claw plunger |
| 13 | pin feed tube |
| 14 | folding module |
| 15 | stripping claw |
| 16 | stripping pin |
| 17 | pin setting sleeve |
| 18 | claw setting sleeve |
| 19 | rotary module |
| 21 | first plunger unit |
| 22 | second plunger unit |
| 25 | first plunger holder |
| 25.1 | second plunger holder |
| 26 | |
| 28 | stripping pin insertion unit |
| 29 | stripping claw insertion unit |
| 30 | pin clamping slit |
| 30.1 | claw clamping slit |
| 33 | central passage |
| 33.1 | first passage |
| 33.2 | third passage |
| 34 | central passage |
| 34.1 | fourth passage |
| 34.2 | sixth passage |
| 35 | drive |
| 36 | pressure plate movement direction |
| 37 | claw setting sleeve rotation movement |
| 38 | pin setting sleeve folding direction |
| 39 | stripping pin transport direction |
| 40 | first pin plunger head |
| 41 | second pin plunger head |
| 42 | first claw plunger head |
| 43 | second claw plunger head |
| 44 | first pin plunger spring |
| 44.1 | second pin plunger spring |
| 44.2 | first claw plunger spring |
| 44.3 | second claw plunger spring |
| 45 | first pressure plate recoil spring |
| 45.1 | second pressure plate recoil spring |
| U | base plate underside |
| O | base plate upper side |
| 56 | |
| 57 | |
| 58 | |
| 59 | |
| 60 | |
| 61 | |
| 62 | |
| 63 | |
| 64 | |
| 65 | |
| 66 | |

The invention claimed is:

1. A setting unit for producing a stripping tool with stripping pins and/or with stripping claws, the setting unit comprising:
a head plate;
a base plate, spaced below the head plate, the base plate has a stripping pin insertion unit and a stripping claw insertion unit;
wherein the stripping pin insertion unit interacts with a first plunger unit supported at the base plate and the stripping claw insertion unit supported at the base plate interacts with a second plunger unit;
a pressure plate arranged between the base plate and the head plate, the pressure plate is movable between the base plate and the head plate;

the pressure plate has at least four passages through the pressure plate;

wherein at least one of the passages can be closed by means of a movable module at the pressure plate;

at least one of the first plunger unit and/or the second plunger unit at the then closed at least one of the closed passages can be activated by the pressure plate at the at least one closed passage to move the respective plunger unit toward the base plate.

2. A setting unit according to claim 1, further comprising the stripping pin insertion unit has a folding module configured for delivering a stripping pin via a pin feed tube to a pin setting sleeve and the sleeve having a stripping pin clamping slit.

3. A setting unit according to claim 1, further comprising the stripping claw insertion unit includes a rotary module and includes a claw setting sleeve with a claw clamping slit; and the claw setting sleeve is rotatable by the rotary module.

4. A setting unit according to claim 3, wherein the claw setting sleeve is arranged so as to be rotatable by 360°, wherein a rotational movement of the sleeve can be performed by the rotary module.

5. A setting unit according to claim 1, further comprising:

the first plunger unit has a first plunger holder for guiding a first pin plunger and for guiding a second pin plunger of the first plunger unit;

wherein each of the first and the second pin plungers of the first plunger unit extends movably through the first plunger holder, each of the first and the second pin plungers comprise respectively a first surrounding pin plunger spring, for urging the respective pin plunger toward the head plate;

wherein the first pin plunger and the second pin plunger differ by each plunger having a varying pin plunger head.

6. A setting unit according to claim 1, further comprising the second plunger unit has a second plunger holder for guiding the first claw plunger and the second claw plunger, wherein the first claw plunger and the second claw plunger both extend movably through the second plunger holder and the first claw plunger and the second claw plunger comprise a respective surrounding claw plunger spring for urging the respective plunger toward the head plate; and wherein the first claw plunger and the second claw plunger differ by a varying respective claw plunger head.

7. A setting unit according to claim 1, wherein the base plate, the head plate and the pressure plate are connected to each other via a first guide shaft, a second guide shaft, a third guide shaft and a fourth guide shaft which also guides movement of the pressure plate.

8. A method for operating a setting unit according to claim 1, comprising the following operations:

loading of the pin setting sleeve and/or the claw setting sleeve;

operating the movable module to close at least one of the passages in the pressure plate;

moving the pressure plate in the direction of the base plate for moving at least one of the first and second plunger units at the at least one closed passages;

inserting the pin plunger and or/the claw plunger into the pin setting sleeve or the claw setting sleeve for pressing the stripping pin and/or the stripping claw out of the pin setting sleeve or the claw setting sleeve.

9. A setting unit according to claim 1, further comprising both of the first pin plunger and the second pin plunger extending movably through the plunger holder;

a respective pin plunger spring on the first and second pin plungers for enabling the first and second pin plungers to be moved by the pressure plate for operating respective stripping pins on each of the first and second plungers, and the spring urging the respective ones of the plungers and the respective stripping pin thereon up toward the head plate and away from a stripping position; and the first pin plunger and the second pin plunger of the first plunger unit differ by each of the plungers having a varying pin plunger head.

* * * * *

UNITED STATES PATENT AND TRADEMARK OFFICE
CERTIFICATE OF CORRECTION

PATENT NO. : 10,981,288 B2
APPLICATION NO. : 16/301293
DATED : April 20, 2021
INVENTOR(S) : Joachim Jakob Page 1 of 1

It is certified that error appears in the above-identified patent and that said Letters Patent is hereby corrected as shown below:

In the Claims

Claim 8, Column 10, Line 22, replace "and or/the" with "and/or the".

Signed and Sealed this
Tenth Day of August, 2021

Drew Hirshfeld
*Performing the Functions and Duties of the
Under Secretary of Commerce for Intellectual Property and
Director of the United States Patent and Trademark Office*